Nov. 26, 1946.   E. A. BROWN   2,411,709
TOOL DRESSING FIXTURE
Filed Aug. 19, 1944
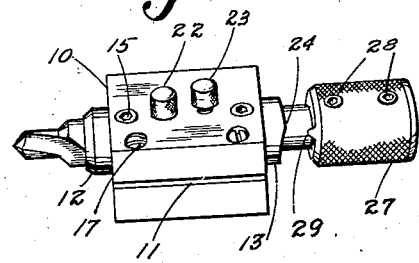
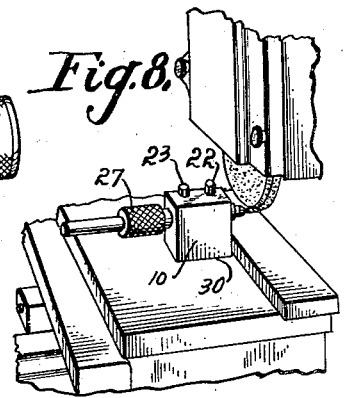
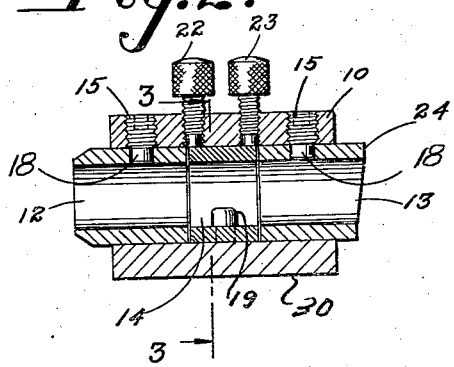
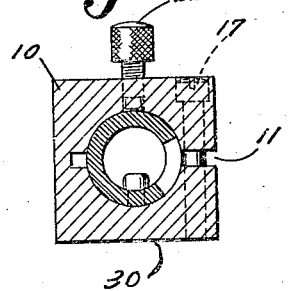
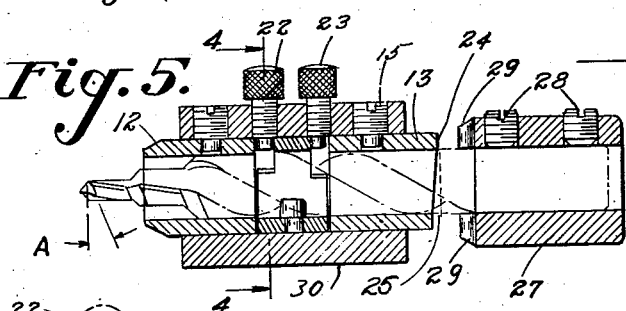
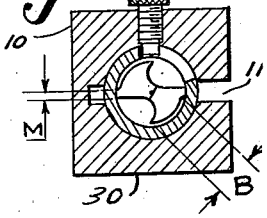
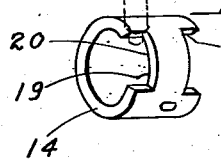
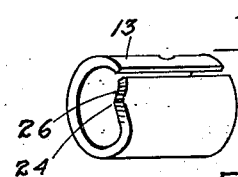
INVENTOR.
ERNEST A. BROWN.
BY Richey & Watts.
ATTORNEYS Patented Nov. 26, 1946

2,411,709

UNITED STATES PATENT OFFICE 2,411,709

TOOL DRESSING FIXTURE

Ernest A. Brown, Elyria, Ohio

Application August 19, 1944, Serial No. 550,151

4 Claims. (Cl. 51—219)

This invention relates broadly to grinding fixtures and more specifically to mechanism for controlling the oscillatory movement of drills and similar tools while forming the lip angle and land margin clearances therein.

One of the objects of the invention is to provide a fixture for dressing or re-working end cutting tools of the type used in screw machines, to form combination drills, counterbores or center drills therefrom, the fixture being designed to produce the proper lip clearance angle, land margin and land clearance in each stepped portion thereof.

Another object of the invention is to provide a drill holder which is designed to facilitate production of land margins of various widths.

Another object of the invention is to construct a fixture having demountable bushings therein which are mounted for ready removal to accommodate substitutive bushings of different size.

Another object of the invention is to provide a drill supporting fixture which is adapted to develop relief contours of uniform configuration and proper form when used by unskilled or inexperienced operators.

Further objects of the invention reside in the provision of a fixture which is economic of manufacture, sturdy of structure and susceptible of use on grinding machines of various forms.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein the preferred embodiment of the invention is illustrated:

Fig. 1 is a view in perspective of the improved tool dressing fixture including a drill shown in its assembled relation therein;

Fig. 2 is a longitudinal section through the fixture shown in Fig. 1;

Fig. 3 is a transverse section taken on a plane indicated by the line 3—3 in Fig. 2;

Fig. 4 is a transverse section through the fixture illustrated in Fig. 1;

Fig. 5 is a longitudinal section through the fixture showing in dotted lines a helical fluted drill in place;

Fig. 6 is a view in perspective of the sleeve employed to control the development of the land clearance and land margin in the tool;

Fig. 7 is a view in perspective of the bushing having the cam therein for the development of the lip clearance in the tools; and Fig. 8 is a view in perspective of the fixture and fragmentary portion of a grinding machine, the illustration showing the operative relation of the fixture, the tool or work piece, and the grinding wheel.

Referring first to Figs. 2 and 3, the fixture comprises a rectangular block 10 machined with a longitudinal kerf 11 in one side thereof and bored throughout its length for the reception of bushings 12 and 13 and rotatable, centrally disposed sleeve 14. The split portion of the block is drilled and tapped to receive set screws 17 which are provided to accommodate the clamped retention of the bushings within the block. The block is further drilled and tapped for set screws 15 which are preferably formed with cylindrical ends 18 adapted for engagement in openings in the bushings and provided to prevent longitudinal movement thereof.

The side wall of the sleeve 14 is drilled to receive a pin 19 that protrudes inwardly in the bore and is configured for sliding engagement within the flute of the cutter supported therein. Portions of the end walls of the sleeve are machined to form slots 20 and 21 for the reception of the end portions of thumb screws 22 and 23 mounted in the block 10. The slots are designed to permit limited rotative movement of the tool while grinding the land clearance and to arrest such movement and initiate a helical movement of the tool through the action of the pin 19 when the grinding wheel reaches the point that defines the width of the land margin. One of the slots is formed a few thousandths of an inch longer than the other in order to facilitate the production of lands of different width, either the screw 22 or 23 being engaged within the proper slot during such operation. When a tool or similar helical fluted cutter is rotated within the fixture the pin 19 will cause the rotation of the sleeve until the shoulder of the slot therein is brought into engagement with the thumb screw. Whereupon the sleeve will cease to rotate and the tool will be moved in the helical path of the flute leaving a land margin M (Fig. 4) of the desired width and of the diameter obtained in a preliminary circle grinding operation. The end wall of the outer bushing 13 is formed with a cam 24 having a lift 25 of sufficient height to develop the lip clearance angle desired in the tool for which the bushing is designed, for example, the angle A in the drill shown in Fig. 5. The rise 26 of the cam is equal to the width of the land clearance in such a tool, for example, the dimension B in Fig. 7.

The block 10 may be clamped upon the platen of the grinding machine or mounted with the base 30 thereof upon the face of magnetic chuck of the type customarily used in such environs. In setting up the fixture the block is adjusted relative to the grinding wheel so that the medial axis of the tool to be ground will lie in a plane common to the vertical axis of the grinding wheel spindle and with the end portion of the tool engaged with the circumferential face of the wheel. In forming the stepped shoulders on the tool the feed may be effected by raising the knee of the machine and reciprocating the platen in the customary manner.

A collar 27 bored for engagement with the shank of the tool to be dressed is provided to effect the lineal translation of the tool during the lip clearance grinding operation. The collar or follower is locked upon the tool with set screws 28 mounted on the body thereof, the end wall of the collar being formed with lugs 29 designed for engagement with the cam 24. The rake or lip clearance is formed by first mounting the collar 27 upon the tool, adjusting the block relative to the grinding wheel to the point angle of the tool, retracting the thumb screws 22 and 23 to facilitate the free rotation of the tool within the bushings 12 and 13, bringing the lip of the tool into contact with the grinding wheel, then while holding the lug 29 into contact with the cam 24 rotating and simultaneously feeding the tool into the grinding wheel until the stock is ground away to the full length of the point.

The foregoing procedure comprehends the operations required in grinding the lip clearance and land margin in end cutting tools of the usual form. In redressing or reworking tools of stepped diameters such, for example, as combination or center drills, as used in screw machines, the several shouldered steps in the drills are first circled ground to size, then each step in turn is grounded to the proper point angle, lip clearance, land margin and land clearance in the manner described above.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A grinding fixture for helical fluted cutting tools comprising a block having a bore therein extended throughout the length thereof, bushings in said bore for the support of the tool to be ground, a collar adapted for securement on the shank of the tool, a cam in the end wall of one of said bushings configured to advance the tool in the pattern of the lip clearance when the tool is rotated with the collar engaged with said cam, a sleeve rotatable within said bore having an elongated opening therein, a pin in said block disposed for engagement within the opening in the sleeve to delimit the rotative movement thereof for grinding the land margin and a second pin in the sleeve arranged for engagement with the flutes in the tool to effect the helical movement thereof for grinding the land clearance.

2. A grinding fixture for grinding the lip clearance, land and land clearance in helical fluted drills comprising a rectangular block bored throughout its length, bushings in each end thereof for guiding and supporting a drill, a cam in the end wall of one of the bushings, a collar engageable with the drill and said cam to facilitate grinding the lip clearance in the drill, a sleeve having a slot in the end wall thereof in said block, a pin in the bore of said sleeve and means in said block to delimit the rotative movement of said sleeve.

3. A grinding fixture for fluted drills comprising a block having a bore therein, guide bushings for each size drill demountably supported in the opposed ends of said bore, a cam on the free end of one of said bushings, collars for each size drill demountably supported on the drill, a sleeve rotatably mounted within said bore intermediate said bushings, a pin in said sleeve adapted for engagement with the flute in the drill being ground, a pin in said block arranged for reentrant engagement in the bore of said block, and shoulders in said sleeve engageable with the last named pin to delimit the rotative movement thereof.

4. A grinding fixture for helical fluted tools, comprising a block having a hole therein for the reception of the tool, bushings in the opposed ends of said hole, a cam on the end wall of one of said bushings to guide the tool inwardly and outwardly in a helical path, a collar adapted for engagement with said cam and for demountable securement on the tool, a sleeve mounted for rotative movement in said hole, means to delimit the rotation thereof, and means in said sleeve to effect the helical movement of said tool after the rotative movement of the sleeve has been arrested.

ERNEST A. BROWN.